US010609515B1

(12) United States Patent
Bender et al.

(10) Patent No.: US 10,609,515 B1
(45) Date of Patent: Mar. 31, 2020

(54) OPTIMIZING NAVIGATION SYSTEM ROUTES BASED ON SIGNAL STRENGTH

(71) Applicant: INTERNATIONAL BUSINESS MACHINES CORPORATION, Armonk, NY (US)

(72) Inventors: Michael Bender, Rye Brook, NY (US); Gregory J. Boss, Saginaw, MI (US); Gina M. Mazzarelli, New Windsor, NY (US); Craig M. Trim, Ventura, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/202,359

(22) Filed: Nov. 28, 2018

(51) Int. Cl.
*H04W 4/024* (2018.01)
*G01C 21/34* (2006.01)

(52) U.S. Cl.
CPC ........ *H04W 4/024* (2018.02); *G01C 21/3453* (2013.01)

(58) Field of Classification Search
CPC ..... H04W 88/08; H04W 24/02; H04W 4/029; H04W 64/00; H04W 4/025; H04W 24/04; H04W 4/02; H04W 4/021; H04W 4/024; G01C 21/3461; G01C 21/34; G01C 21/30; G01C 21/3453; G01C 21/3484; G01C 21/3691; G01C 21/3626; G01C 21/3415; G01C 21/3697; G01C 21/28; G01C 21/3446; G01C 21/3667; G01C 21/3676; G01C 21/3407; G01C 3/08
See application file for complete search history.

(56) References Cited

U.S. PATENT DOCUMENTS 8,311,741 B1 * 11/2012 Lawther ............. G01C 21/3461
701/527
9,043,135 B2 5/2015 Dave
(Continued)

OTHER PUBLICATIONS

Burnside, "Does the Phone Make a Difference in Reception?," https://itstillworks.com/phone-make-difference-reception-2335.html, Accessed Oct. 26, 2018, 2 pages.

*Primary Examiner* — Daniel Lai
(74) *Attorney, Agent, or Firm* — Andrew D. Wright; Brian Restauro; Roberts Mlotkowski Safran Cole & Calderon, P.C.

(57) ABSTRACT

A computer-implemented method includes: determining, by a computer device, route options for traveling between a start point and an end point during a time of a call; determining, by the computer device, whether at least one of the route options satisfies a minimum acceptable signal strength and a maximum acceptable added travel time; in response to determining that at least one of the route options satisfies the minimum acceptable signal strength and the maximum acceptable added travel time, causing the at least one route to be displayed via a user interface of a navigation system; and in response to determining that none of the route options satisfies the minimum acceptable signal strength and the maximum acceptable added travel time, determining a route including a waypoint that satisfies the minimum acceptable signal strength at the time of the call, and causing the route including the waypoint to be displayed via the user interface of the navigation system.

20 Claims, 4 Drawing Sheets

(56) References Cited

U.S. PATENT DOCUMENTS

| | | | |
|---|---|---|---|
| 2013/0024107 A1* | 1/2013 | Xie | G01C 21/3461 |
| | | | 701/423 |
| 2016/0282129 A1 | 9/2016 | Wang | |
| 2017/0201856 A1* | 7/2017 | Wilbur | G01C 21/3614 |
| 2017/0328725 A1 | 11/2017 | Schlesinger | |

* cited by examiner

FIG. 5 ically display road maps in human readable format, show a current location of a user on the map, determine and show a route on the map from a start point to an end point, and update the displayed map and the route as the user moves in real space (e.g., as the user walks, drives their car, etc.).

OPTIMIZING NAVIGATION SYSTEM ROUTES BASED ON SIGNAL STRENGTH

BACKGROUND

The present invention relates generally to navigation systems and, more particularly, to optimizing navigation system routes for a user based on signal strength of a cellular telephone associated with the user.

Navigation systems are computer devices that assist humans in determining a route along roadways from a start point to an end point. Navigation systems are commonly included in smartphones, integrated into vehicles, or carried as a separate device in a vehicle. Navigation systems typically display road maps in human readable format, show a current location of a user on the map, determine and show a route on the map from a start point to an end point, and update the displayed map and the route as the user moves in real space (e.g., as the user walks, drives their car, etc.).

SUMMARY

In a first aspect of the invention, there is a computer-implemented method including: determining, by a computer device, route options for traveling between a start point and an end point during a time of a call; determining, by the computer device, whether at least one of the route options satisfies a minimum acceptable signal strength and a maximum acceptable added travel time; in response to determining that at least one of the route options satisfies the minimum acceptable signal strength and the maximum acceptable added travel time, causing the at least one route to be displayed via a user interface of a navigation system; and in response to determining that none of the route options satisfies the minimum acceptable signal strength and the maximum acceptable added travel time, determining a route including a waypoint that satisfies the minimum acceptable signal strength at the time of the call, and causing the route including the waypoint to be displayed via the user interface of the navigation system.

In another aspect of the invention, there is a computer program product including a computer readable storage medium having program instructions embodied therewith. The program instructions are executable by a computer device to cause the computer device to: determine route options for traveling between a start point and an end point during a time of a call; determine whether at least one of the route options satisfies a minimum acceptable signal strength and a maximum acceptable added travel time; in response to determining that at least one of the route options satisfies the minimum acceptable signal strength and the maximum acceptable added travel time, cause the at least one route to be displayed via a user interface of a navigation system; and in response to determining that none of the route options satisfies the minimum acceptable signal strength and the maximum acceptable added travel time, determine a route including a waypoint that satisfies the minimum acceptable signal strength at the time of the call, and cause the route including the waypoint to be displayed via the user interface of the navigation system.

In another aspect of the invention, there is system including a processor, a computer readable memory, and a computer readable storage medium. The system includes: program instructions to determine route options for traveling between a start point and an end point during a time of a call; program instructions to determine whether at least one of the route options satisfies a minimum acceptable signal strength and a maximum acceptable added travel time; program instructions to, in response to determining that at least one of the route options satisfies the minimum acceptable signal strength and the maximum acceptable added travel time, cause the at least one route to be displayed via a user interface of a navigation system; and program instructions to, in response to that none of the route options satisfies the minimum acceptable signal strength and the maximum acceptable added travel time, determine a route including a waypoint that satisfies the minimum acceptable signal strength at the time of the call, and cause the route including the waypoint to be displayed via the user interface of the navigation system. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to navigation systems and, more particularly, to optimizing navigation system routes for a user based on signal strength of a cellular telephone associated with the user. Aspects of the invention provide personalized route recommendations to reduce the risk of a dropped call for a particular user. In embodiments, the system uses historic data of the user's cellular telephone signal strength and/or predictions of the user's cellular telephone signal strength to determine an optimal route from a start point to an end point that avoids locations where the user's cellular telephone will have less than a predefined acceptable level of signal strength. In embodiments, the system takes into account a time of an upcoming telephone call, an importance of the call, and the user's willingness to go out of the way (e.g., drive for a longer time) when determining the optimal route. In this manner, the system provides the user with a route that is optimized to maintain a minimum level of signal strength during a planned call, such that the likelihood of dropping the call while in route is lessened. In embodiments, if the system determines that no complete route (from the start point to the end point) satisfies all the conditions, then the system determines one or more routes with waypoints at which the user may stop and complete their call without losing signal strength.

People often conduct telephone calls using their cellular telephone while driving. However, as cellular telephone service coverage is not consistent at all locations, it is all too common for a cellular call to be dropped (e.g., interrupted by a lack of sufficient cellular signal to maintain the call) while driving. Dropped calls are annoying in some instances, and harmful to reputation and/or business in other instances.

Aspects of the invention address these problems by providing directions to a user based on signal strength associated with that particular user. Implementations of the invention utilize historic signal strengths of a user's phone at different locations to determine a route for the user. When historic data for the user's phone is not available for a desired route, the system leverages historic data from other phones, and generates predicted signal strengths for the user's phone using the historic data from the other phones. Once the particular phone capability for signal strength in areas is determined, the system then creates a personalized route recommendation for the user that reduces the risk of a dropped call. In this manner, implementations of the invention provide a system and method to: determine personalized signal strength; compare personal signal strength to a crowd sourced rating; and find available routes for a trip based on the user's personalized signal strength.

Three exemplary use cases illustrate advantages provided by aspects of the invention. In the first use case, a first user needs to take a business call while driving to an appointment. The system analyzes the user's signal strength along different route options for driving to the appointment, and suggests the route option that has the highest level of signal strength even though the suggested route is five minutes longer than one of the other possible routes.

In the second use case, a second user plans to conduct a business call while commuting to the office. The system analyzes the user's signal strength along different route options for the commute, and determines that no options exist where the signal strength remains above a threshold minimum for the entire commute. In response to this determination, the system suggests a route with a coffee shop at which the user may stop to complete the call, e.g., before traveling into an area of low signal strength.

In the third use case, a third user plans to conduct a call while driving from a start point to an end point. This user happens to have an older phone that is not as strong as many newer phones. Based on historic data obtained for this user's phone, the system determines that the signal strength for this user's phone is on average about 10% less than the signal strength of other phones. Based on this determination, the system suggests a route that travels nearer to cell towers so that the signal strength is maximized during the drive.

As is understood from the exemplary use cases, aspects of the invention include a method for providing driving directions based on cell phone signal strength. In embodiments, the method compares actual signal strength with historic signal strength for an individual mobile device to predict strength from crowd sourced references to account for differences in device quality. In embodiments, the method recommends a place (e.g., a waypoint) to stop during a trip to avoid dropping a call at an important time.

Embodiments of the invention improve the technology of navigation systems by providing users with automated tools that optimize navigation system routes for a user based on signal strength of a cellular telephone associated with the user. Embodiments of the invention employ an unconventional arrangement of steps including: determining, by a computer device, route options for traveling between a start point and an end point during a time of a call; determining, by the computer device, whether at least one of the route options satisfies a minimum acceptable signal strength and a maximum acceptable added travel time; in response to determining that at least one of the route options satisfies the minimum acceptable signal strength and the maximum acceptable added travel time, causing the at least one route to be displayed via a user interface of a navigation system; and in response to that none of the route options satisfies the minimum acceptable signal strength and the maximum acceptable added travel time, determining a route including a waypoint that satisfies the minimum acceptable signal strength at the time of the call, and causing the route including the waypoint to be displayed via the user interface of the navigation system. The steps themselves are unconventional, and the combination of the steps is also unconventional. For example, in embodiments, the method includes determining a relationship of signal strength of a user phone to signal strength of other phones. This relationship is newly created information that does not exist in any system, and this new information is then used in subsequent steps in an unconventional manner.

To the extent implementations of the invention collect, store, or employ personal information provided by, or obtained from, individuals (for example, calendar data, location, signal strength, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
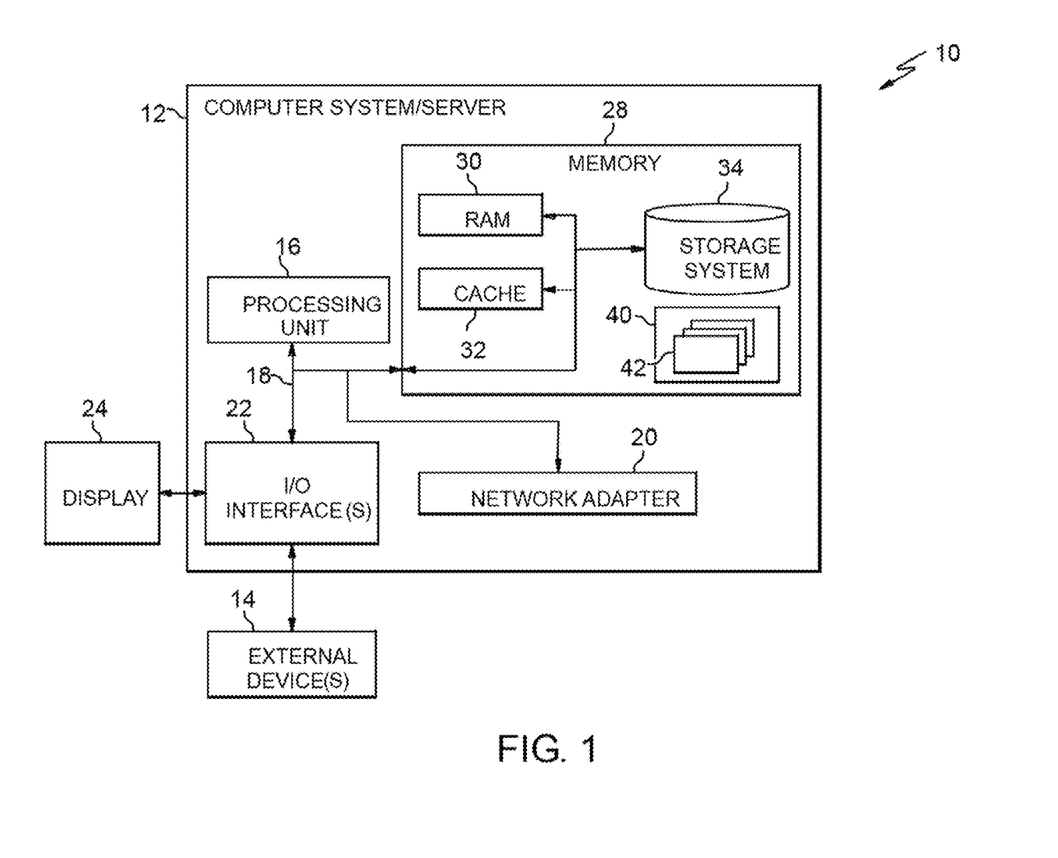
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
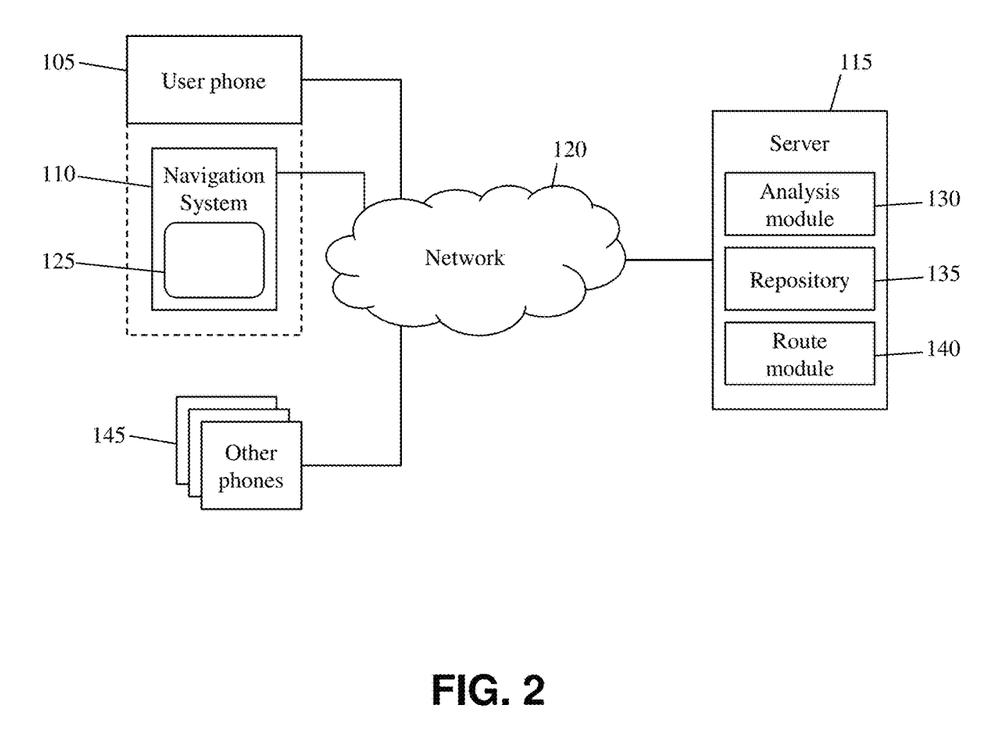
FIG. 2 shows a block diagram of an exemplary environment in accordance with aspects of the invention.

FIG. 2 shows a block diagram of an exemplary environment in accordance with aspects of the invention. In embodiments, the environment includes a user phone 105, a navigation system 110, and a server 115. The user phone 105 comprises a cellular telephone, such as a smartphone, and may include one or more components of the computer system 12 of FIG. 1. The user phone 105 is configured to make cellular telephone calls to other end points (e.g., other phones) via one or more cellular telecommunication networks, which may be part of a network 120 shown in FIG. 2.

In accordance with aspects of the invention, the navigation system 110 is a device or software that is configured to: display road maps in human readable format in a user interface (UI) 125; show a current location of a user on the map; receive user input defining a start point and/or an end point; determine and show a route on the map from the start point to the end point; and update the displayed map and the route as the user moves in real space (e.g., as the user walks, drives their car, etc.). In one embodiment represented by the dashed box in FIG. 2, the navigation system 110 is part of the user phone 105, e.g., as a program module (such as program module 42 of FIG. 1) that runs on the user phone 105 and that displays the UI 125 on the display of the user phone 105. In another embodiment, the navigation system 110 is separate from the user phone 105. In one example, the navigation system 110 is integrated as part of a vehicle (e.g., such as a car) and displays the UI 125 on a display of the vehicle. In another example, the navigation system 110 is a standalone computer device comprising one or more components of the computer system 12 of FIG. 1, and which displays the UI 125 on its own display. In embodiments where the navigation system 110 is separate from the user phone 105, the navigation system 110 communicates with the user phone 105, e.g., via wireless communication such as BLUETOOTH®, LAN, etc.

In embodiments, the server 115 comprises a computer device that includes one or more components of the computer system 12 of FIG. 1. In accordance with aspects of the invention, the server 115 includes an analysis module 130 and a route module 140 that are configured to perform one or more functions described herein. Each of the analysis module 130 and the route module 140 may include one or more program module 42 as described with respect to FIG. 1. In implementations, the server 115 also comprises or accesses a repository 135, which may comprise a storage system 34 as described with respect to FIG. 1.

In embodiments, separate modules of the server 115 may be integrated into a single module. Additionally, or alternatively, a single module of the server 115 may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In embodiments, the analysis module 130 determines the location and signal strength of the user phone 105 while the user phone 105 is engaged in a cellular call. The location of the user phone 105 may be determined in real time using a global positing system (e.g., GPS) component included in the user phone 105 and/or using triangulation techniques with cellular towers in the network 120. The signal strength of the user phone 105 may be determined in real time by an application on the user phone 105 and reported from the phone to the analysis module 130 via the network 120. In embodiments, the analysis module 130 stores associated pairs of location and signal strength as data points in the repository 135. In a particular embodiment, the analysis module 130 stores data records including: date; time; location of the user phone 105 at the date and time; signal strength of the user phone 105 at the date, time, and location; type of the user phone 105 (e.g., brand, model, etc.); and cellular service provider used by the user phone 105 during the call. In this manner, the analysis module 130 creates a corpus of historic data of the observed (e.g., actual) signal strength of the user phone 105 at different locations.

In accordance with aspects of the invention, the analysis module 130 also determines the location and signal strength of other phones 145. As with the data determined for phone 105, the analysis module 130 stores associated pairs of location and signal strength of the other phones 145 as data points in the repository 135. In a particular embodiment, the analysis module 130 stores data records including: date; time; location of the other phone 145 at the date and time; signal strength of the other phone 145 at the date, time, and location; type of the other phone 145 (e.g., brand, model, etc.); and cellular service provider used by the other phone 145 during the call. In this manner, the analysis module 130 creates a corpus of historic data of the observed (e.g., actual) signal strength of the other phones 145 at different locations.

According to aspects of the invention, the analysis module 130 determines a relationship of signal strength of the user phone 105 to the other phones 145. In embodiments, the analysis module 130 analyzes the data in the repository 135 to determine locations where there is signal strength data for both the user phone 105 and at least one other phone 145. In one embodiment, based on the signal strength data at these identified locations, the module determines a ratio of signal strength of the user phone 105 to signal strength of the other phones 145. For example, the ratio may be determined using the following formula in which "n" represents the number of locations for which there is signal strength data for both the user phone 105 and at least one other phone 145:

$$\text{Signal Strength Ratio} = \frac{1}{n} * \sum_{i=1}^{n} \left( \frac{\text{Signal strength of user phone 105 at location } i}{\text{Signal strength of other phone 145 at location } i} \right)$$

The above formula for Signal Strength Ratio is one example of a relationship of signal strength of the user phone 105 to signal strength of the other phones 145. Aspects of the invention are not limited to this particular relationship, and implementations of the invention may utilize other, different relationships determined from the historic data stored in the repository 135. Other parameters that may be used in determining such relationships include, but are not limited to: type of the user phone 105; type of the other phone 145; cellular service provider used by the user phone 105; cellular service provider used by the other phone 145.

In accordance with aspects of the invention, after determining a relationship of signal strength of the user phone 105 to the other phones 145, the analysis module 130 may use the determined relationship to predict a signal strength of the user phone 105 at locations where there is no historic (actual) signal strength data for the user phone 105. In embodiments, when a determined driving route travels to a location for which there is no data in the repository 135 for signal strength of the user phone 105, the analysis module 130 predicts a signal strength of the user phone 105 at this location using the determined relationship and historic signal strength data of one or more other phones 145 at this location. In one example, the analysis module 130 is configured to: determine the repository 135 does not include signal strength data for the user phone 105 at a location; determine the repository 135 does include signal strength data for at least one other phone 145 at the location; determine an average signal strength of the at least one other phone 145 at the location; and predict a signal strength of the user phone 105 at the location by multiplying the average signal strength of the at least one other phone 145 at the location by the Signal Strength Ratio for the user phone 105.

With continued reference to FIG. 2, according to aspects of the invention, the system is configured to: determine a start point and an end point between which the user wishes to travel (e.g., via user input to the navigation system 110); determine a time of a telephone call the user plans to make during the travel (e.g., via user input to the navigation system 110 and/or by accessing an electronic calendar stored on the user phone 105); determine a minimum acceptable signal strength of the user phone 105 during the call (e.g., by user input to the navigation system 110, by user input defining a configuration setting, or via a user applied tag associated with a calendar entry of the call); determine an acceptable amount of added time for the travel (e.g., by user input to the navigation system 110 or by user input defining a configuration setting); generate route options for traveling from the start point to the end point (e.g., by the navigation system 110 or the route module 140); determine signal strength of the user phone 105 at locations along the route options (e.g., by the analysis module 130 or the route module 140); and determine whether any of the route options satisfy the minimum acceptable signal strength of the user phone 105 during the call and the acceptable amount of added time for the travel (e.g., by the route module 140).

In the event that one or more of the route options satisfy the minimum acceptable signal strength of the user phone 105 during the call and the acceptable amount of added time for the travel, then the system displays the one or more of the route options via the UI 125 of the navigation system 110. In the event that none of the route options satisfy the minimum acceptable signal strength of the user phone 105 during the call and the acceptable amount of added time for the travel, then the system determines at least one route with a waypoint and displays the route and waypoint via the UI 125 of the navigation system 110.

Figure 3:
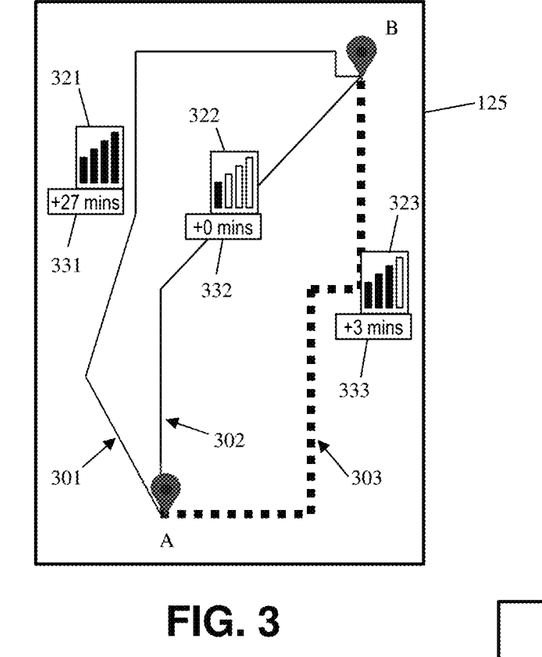
FIGS. 3 and 4 show exemplary use cases in accordance with aspects of the invention.
Figure 4:
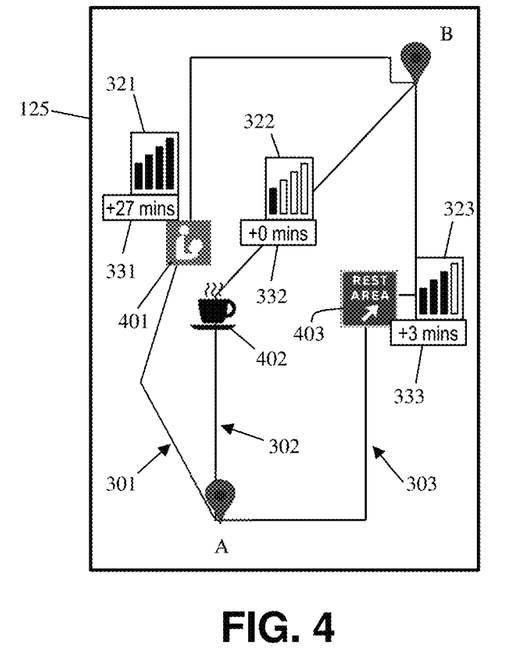

FIGS. 3 and 4 show exemplary use cases in accordance with aspects of the invention. In each of the examples, the user is planning to travel from start point "A" to end point "B" and has entered this information into the navigation system 110. In these examples, the user also plans to conduct a call using the user phone 105 while traveling from point A to point B (e.g., as determined either from user input to the navigation system 110 or by the system accessing the user's electronic calendar that indicates a call scheduled from a time that coincides with the predicted time for traveling between point A to point B). In these examples, the user has indicated that they are willing to travel an additional five minutes more than the fastest route in order to maintain a minimum signal strength during the call (e.g., as determined either from user input to the navigation system 110 or by the system accessing the user's configuration settings that predefined the maximum acceptable added travel time). In the example of FIG. 3, the user has indicated that the minimum acceptable signal strength for the call during the travel is 3 bars out of 4. In the example, of FIG. 4, the user has indicated that the minimum acceptable signal strength for the call during the travel is 4 out of 4 bars.

As shown in FIG. 3, the UI 125 displays routes 301, 302, 303 between start point A and end point B. In this example, the UI 125 displays an indication 321 of the signal strength of the user phone 105 along the first route 301, an indication 322 of the signal strength of the user phone 105 along the second route 302, and an indication 323 of the signal strength of the user phone 105 along the third route 303. The UI 125 also displays an indication 331 of the added travel time for the first route 301 (e.g., compared to the fastest route which is the second route in this example), an indication 332 of the added travel time for the second route 302, and an indication 333 of the added travel time for the third route 303.

As shown in the example of FIG. 3, the first route 301 satisfies the minimum signal strength condition (e.g., a minimum signal strength of 3 out of 4 bars in this example) but does not satisfy the maximum acceptable added time condition (e.g., a maximum added time of 5 minutes in this example). The second route 302 does not satisfy the minimum signal strength condition and does not satisfy the maximum acceptable added time condition. The third route 303 satisfies both the minimum signal strength condition and the maximum acceptable added time condition. As a result, the system causes the UI 125 to suggest the third route 303 with a unique visual display compared to the other routes, such as highlighted, dots, etc.

As noted above, the example of FIG. 4 differs from that of FIG. 3 in that the minimum acceptable signal strength is different (e.g., 3 out 4 bars for the example of FIG. 3, and 4 out of 4 bars for the example of FIG. 4). As shown in FIG. 4, the first route 301 satisfies the minimum signal strength condition but does not satisfy the maximum acceptable added time condition. The second route does not satisfy either condition. The third route satisfies the maximum acceptable added time condition but does not satisfy the minimum signal strength condition. As such, none of the routes satisfies both conditions. In this situation, implementations of the invention display waypoints 401, 402, 403 along the routes 301, 302, 303, wherein the waypoints represent locations where the signal strength of the user phone 105 meets the minimum signal strength condition. In embodiments, the waypoints are determined based on types of locations defined by the user in configuration settings. For example, in the configuration settings of the system, the user may select library, coffee shop, and rest area from a list of plural types of locations. Based on this user input, the system identifies waypoints that match the user-defined types of locations. In this manner, the system informs the user of waypoints that match their preferred type(s) of stopping location, so that the user can complete the call at one of the waypoints where the signal strength of the user phone 105 meets the minimum signal strength condition.

Figure 5:
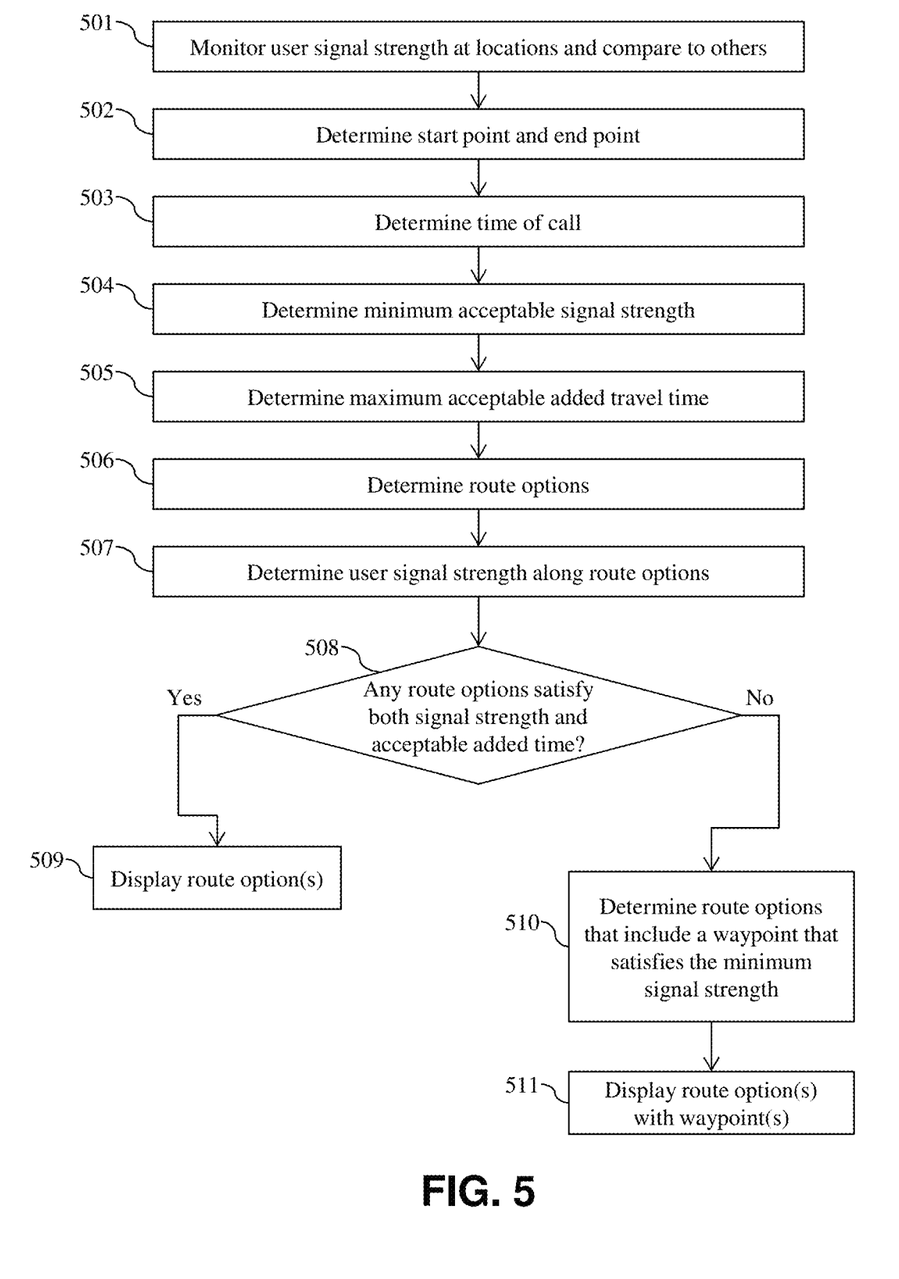
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 2 and are described with reference to elements depicted in FIG. 2.

At step 501, the system monitors the signal strength of the user phone 105 at different locations and compares it to other phones 145. In embodiments, and as described with respect to FIG. 2, the analysis module 130 creates a corpus of historic data of the observed (e.g., actual) signal strength of the user phone 105 at different locations. In embodiments, the analysis module 130 also creates a corpus of historic data of the observed (e.g., actual) signal strength of the other phones 145 at different locations. In embodiments, the analysis module 130 also determines a relationship of signal strength of the user phone 105 to signal strength of the other phones 145.

At step 502, the system determines a start point and an end point between which the user wishes to travel. In embodiments, and as described with respect to FIG. 2, the user enters the start point and the end point into the navigation system 110, and the route module 140 receives this information from the navigation system 110 via the network 120.

At step 503, the system determines a time of a telephone call the user plans to make while traveling from the start point and the end point (of step 502). In embodiments, and as described with respect to FIG. 2, the user enters this information into the navigation system 110, and the route module 140 receives this information from the navigation system 110 via the network 120. In another example, the route module 140 determines this information from the user's electronic calendar, e.g., stored on the user phone 105 or at another device.

At step 504, the system determines a minimum acceptable signal strength of the user phone 105 during the time of the call (from step 503). In embodiments, and as described with respect to FIG. 2, the user enters this information into the navigation system 110, and the route module 140 receives this information from the navigation system 110 via the network 120. In another example, the user defines minimum acceptable signal strength as a configuration setting, and the route module 140 obtains this information from the stored configuration setting. In another example, the user applies a tag to the calendar entry associated with this call, and the route module 140 obtains this tag information from the user's electronic calendar. In embodiments, the route module 140 stores data that defines different minimum acceptable signal strengths for different types of tags. In this manner, by accessing the stored data, the route module 140 can use the obtained tag and the stored data to determine the minimum acceptable signal strength for this call.

At step 505, the system determines a maximum acceptable amount of added travel time for traveling from the start point and the end point (of step 502). In embodiments, and as described with respect to FIG. 2, the user enters this information into the navigation system 110, and the route module 140 receives this information from the navigation system 110 via the network 120. In another example, the user defines maximum acceptable amount of added travel time as a configuration setting, and the route module 140 obtains this information from the stored configuration setting. In one example, the maximum acceptable amount of added travel time is defined in terms of minutes (e.g., a maximum of 5 minutes over the fastest route). In another example, the maximum acceptable amount of added travel time is defined in terms of a percent (e.g., a maximum of 5% more time than the fastest route).

At step 506, the system determines route options for traveling from the start point to the end point (of step 502). In embodiments, and as described with respect to FIG. 2, the navigation system 110 generates one or more routes between the start point and the end point using conventional route generation techniques, and the route module 140 receives this information from the navigation system 110 via the network 120. In another example, the route module 140 generates one or more routes between the start point and the end point using conventional route generation techniques.

At step 507, the system determines signal strength of the user phone 105 at locations along the route options (from step 506) and during the time of the call (from step 503). In embodiments, and as described with respect to FIG. 2, the route module 140 determines, from the repository 135, historic (e.g., actual) signal strength data of the user phone 105 at locations along the route options. For any locations along the route options where the repository 135 does not include historic (e.g., actual) signal strength data of the user phone 105, the analysis module 130 generates a predicted signal strength of the user phone 105 at these locations using the determined relationship (from step 501) and historic (e.g., actual) signal strength data of the other phones 145 at the locations. In this manner, the route module 140 determines an actual or predicted signal strength of the user phone 105 at discrete locations along each of the route options. In some embodiments, step 507 comprises the route module 140 determines signal strength at locations along the route options at times that coincide with the call of step 503. In this manner, the processing time is reduced (e.g., by determining signal strength at less than all the locations along each of the routes), thereby increasing the speed at which results are provided to the user.

At step 508, the system determines whether any of the route options (from step 506) satisfy the minimum acceptable signal strength of the user phone 105 during the call and the maximum acceptable added travel time. In embodiments, and as described with respect to FIG. 2, the route module 140 compares the determined signal strength at locations along a route option to the minimum acceptable signal strength to determine whether the route option satisfies the minimum acceptable signal strength condition. In embodiments, the route module 140 also compares the determined travel time for a route option to the maximum acceptable added travel time to determine whether the route option satisfies the maximum acceptable added travel time condition.

In the event that at least one of the route options satisfies both conditions, then at step 509 the system displays the route options to the user. In embodiments, and as described with respect to FIG. 2, the route module 140 sends data to the navigation system 110 that causes the navigation system 110 to display the routes (e.g., as depicted in FIG. 3).

In the event that none of the route options satisfy both conditions, then at step 510 the system determines route options that include one or more waypoints that satisfy the minimum acceptable signal strength condition at the time of the call (from step 503). In embodiments, and as described with respect to FIG. 2, the route module 140 determines waypoints based on user-defined preferred types of locations. In another example, the system determines waypoints based on comparing locations along the route options to locations where a user has conducted a call in the past. In embodiments, the waypoints are locations at which the user phone has an actual or predicted signal strength that satisfies the minimum acceptable signal strength condition at the time of the call, and that match the user-defined preferred types of locations (or that match the locations where a user has conducted a call in the past).

At step 511 the system displays the route options with waypoints to the user. In embodiments, and as described with respect to FIG. 2, the route module 140 sends data to the navigation system 110 that causes the navigation system 110 to display the routes and waypoints (e.g., as depicted in FIG. 4).

In light of the description herein, it is understood that aspects of the invention provide computer-implemented method comprising: responsive to receiving a destination input on a user device, optimizing a route to the destination input based, at least in part, on a determination of cellular signal strength of the user device. In aspects, the optimizing the route to the destination input is based, at least in part, on a determination of cellular signal strength of the user device comprising: accessing a database that stores signal strength predictions along the route; accessing a crowd-sourced database that stores known signal strengths for a plurality of other devices along the route; predicting a personalized cellular signal strength of the user device along the route by comparing historic signal strength of the user device to signal strength predictions and the crowd sourced database for known signal strengths to associated with a plurality of other devices; and generating an optimized route that minimizes signal loss based on the predicted personalized cellular signal of the user device. In aspects, the generating the optimized route that minimizes signal loss based on the predicted personalized cellular signal comprises: generating a list of routes to the destination input; and filtering out one or more routes of the generated list of routes that have a predicted signal strength that is lower than an acceptable signal strength. In aspects, the method further comprises generating an optimized route that minimizes signal loss based on the predicted personalized cellular signal of the user device during a specified date and time. In aspects, the method further comprises: determining whether remaining routes of the list of routes navigates to the destination input within an acceptable timeframe; in response to determining that the remaining routes of the list of routes does not navigate to the designation input within an acceptable timeframe, selecting a route from the list of routes that has an acceptable cellular signal strength for a threshold duration of time; identifying specific points along the selected route that does not have an acceptable cellular signal strength; and recommending a location to navigate to that has an acceptable signal strength that is along the route to the destination input.

As described herein, in aspects a method includes: a person enters a starting location, target location, amount of time/miles they are willing to add to a trip and cell phone number into the system; the system extracts all possible routes; the time of the call is entered into the system (manually or from calendar); the system receives cell strength for locations traversed and stored attached to the number; the system inputs generic cell strength from other users or Internet sites; the system determines which routes are available that meet the signal strength criteria. In aspects, signal strength is determined by personal history, and if not available, a quality rating for the phone compared to input from other users to calculate a predicted strength. If no route is available that meets the criteria, the system calculates a rest stop on the route to take the call. Routes options are displayed for the user.

As described herein, in aspects there is a computer enabled system and method for optimizing a travel route around the quality of a cellular signal, the method comprised of: comparing all travel routes between two locations; prioritizing the routes offered based on cellular signal strength; recommending break points on a trip to avoid outages; and presenting a list of potential routes on the mobile device. In aspects, the method further comprises comparing the historic signal strength for a particular device to a plurality of other devices. In aspects, the method further comprises determining the strength of other devices from storing the cell strengths and location from other registered users or from publicly available websites. In aspects, the method further comprises providing recommended locations to stop where cell quality and time options are optimized. In aspects, the method further comprises filtering rest stops based on user profile, user entered data or historical actions. In aspects, the method further comprises accepting manually entered or calendar-based time limits.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining, by a computer device, route options for traveling between a start point and an end point during a time of a call;
    determining, by the computer device, whether at least one of the route options satisfies a minimum acceptable signal strength and a maximum acceptable added travel time;
    in response to determining that at least one of the route options satisfies the minimum acceptable signal strength and the maximum acceptable added travel time, causing the at least one route to be displayed via a user interface of a navigation system; and
    in response to determining that none of the route options satisfies the minimum acceptable signal strength and the maximum acceptable added travel time, determining a route including a waypoint that satisfies the minimum acceptable signal strength at the time of the call, and causing the route including the waypoint to be displayed via the user interface of the navigation system.

2. The method of claim 1, further comprising determining signal strength of a user phone at locations along the route options during the time of the call, wherein the determining whether at least one of the route options satisfies the minimum acceptable signal strength comprises comparing the determined signal strength of the user phone at locations along the route options to the minimum acceptable signal strength.

3. The method of claim 2, wherein the determining signal strength of the user phone at the locations along the route options comprises determining historic signal strength of the user phone at the locations.

4. The method of claim 2, wherein the determining signal strength of the user phone at the locations along the route options comprises predicting signal strength of the user phone at the locations based on a determined relationship and historic signal strength of other phones at the locations.

5. The method of claim 1, wherein the time of the call is determined from one of:
    input from a user at the user interface; and
    an electronic calendar of the user.

6. The method of claim 1, wherein the minimum acceptable signal strength is determined from one of:
    input from a user at the user interface;
    a stored configuration setting; and
    a tag in an electronic calendar of the user.

7. The method of claim 1, wherein the maximum acceptable added travel time is determined from one of:
    input from a user at the user interface; and
    a stored configuration setting.

8. The method of claim 1, wherein the waypoint is determined from one of:
    user-defined types of locations stored in a configuration setting; and
    types of locations the user has historically stopped at while conducting a call.

9. A computer program product, the computer program product comprising a computer readable storage medium having program instructions embodied therewith, the program instructions executable by a computer device to cause the computer device to:
    determine route options for traveling between a start point and an end point during a time of a call;
    determine whether at least one of the route options satisfies a minimum acceptable signal strength and a maximum acceptable added travel time;
    in response to determining that at least one of the route options satisfies the minimum acceptable signal strength and the maximum acceptable added travel time, cause the at least one route to be displayed via a user interface of a navigation system; and
    in response to determining that none of the route options satisfies the minimum acceptable signal strength and the maximum acceptable added travel time, determine a route including a waypoint that satisfies the minimum acceptable signal strength at the time of the call, and cause the route including the waypoint to be displayed via the user interface of the navigation system.

10. The computer program product of claim 9, further comprising determining signal strength of a user phone at locations along the route options during the time of the call, wherein the determining whether at least one of the route options satisfies the minimum acceptable signal strength comprises comparing the determined signal strength of the user phone at locations along the route options to the minimum acceptable signal strength.

11. The computer program product of claim 9, wherein the time of the call is determined from one of:
    input from a user at the user interface; and
    an electronic calendar of the user.

12. The computer program product of claim 9, wherein the minimum acceptable signal strength is determined from one of:
    input from a user at the user interface;
    a stored configuration setting; and
    a tag in an electronic calendar of the user.

13. The computer program product of claim 9, wherein the maximum acceptable added travel time is determined from one of:

input from a user at the user interface; and
a stored configuration setting.

14. The computer program product of claim 9, wherein the waypoint is determined from one of:
   user-defined types of locations stored in a configuration setting; and
   types of locations a user has historically stopped at while conducting a call.

15. A system comprising:
   a processor, a computer readable memory, and a computer readable storage medium;
   program instructions to determine route options for traveling between a start point and an end point during a time of a call;
   program instructions to determine whether at least one of the route options satisfies a minimum acceptable signal strength and a maximum acceptable added travel time;
   program instructions to, in response to determining that at least one of the route options satisfies the minimum acceptable signal strength and the maximum acceptable added travel time, cause the at least one route to be displayed via a user interface of a navigation system; and
   program instructions to, in response to that none of the route options satisfies the minimum acceptable signal strength and the maximum acceptable added travel time, determine a route including a waypoint that satisfies the minimum acceptable signal strength at the time of the call, and cause the route including the waypoint to be displayed via the user interface of the navigation system,
   wherein the program instructions are stored on the computer readable storage medium for execution by the processor via the computer readable memory.

16. The system of claim 15, further comprising determining signal strength of a user phone at locations along the route options during the time of the call, wherein the determining whether at least one of the route options satisfies the minimum acceptable signal strength comprises comparing the determined signal strength of the user phone at locations along the route options to the minimum acceptable signal strength.

17. The system of claim 15, wherein the time of the call is determined from one of:
   input from a user at the user interface; and
   an electronic calendar of the user.

18. The system of claim 15, wherein the minimum acceptable signal strength is determined from one of:
   input from a user at the user interface;
   a stored configuration setting; and
   a tag in an electronic calendar of the user.

19. The system of claim 15, wherein the maximum acceptable added travel time is determined from one of:
   input from a user at the user interface; and
   a stored configuration setting.

20. The system of claim 15, wherein the waypoint is determined from one of:
   user-defined types of locations stored in a configuration setting; and
   types of locations a user has historically stopped at while conducting a call.

* * * * *